United States Patent
Suzuki

(10) Patent No.: US 8,437,939 B2
(45) Date of Patent: May 7, 2013

(54) ROAD INFORMATION DETECTING DEVICE AND VEHICLE CRUISE CONTROL DEVICE

(75) Inventor: Koji Suzuki, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/055,556

(22) PCT Filed: Jan. 29, 2010

(86) PCT No.: PCT/JP2010/051260
§ 371 (c)(1),
(2), (4) Date: Jan. 24, 2011

(87) PCT Pub. No.: WO2011/092849
PCT Pub. Date: Aug. 4, 2011

(65) Prior Publication Data
US 2012/0290184 A1      Nov. 15, 2012

(51) Int. Cl.
*B60T 8/32*    (2006.01)
*G05D 1/00*    (2006.01)
*G06F 7/00*    (2006.01)
*G06F 17/00*   (2006.01)

(52) U.S. Cl. ........... 701/93; 701/32.4; 701/96; 701/117; 701/423; 701/448

(58) Field of Classification Search .................. 701/32.4, 701/93, 96, 117, 423, 448
See application file for complete search history.

(56) References Cited

U.S. PATENT DOCUMENTS

| | | | | |
|---|---|---|---|---|
| 6,819,779 | B1 * | 11/2004 | Nichani | 382/104 |
| 6,829,388 | B1 * | 12/2004 | Sakurai | 382/199 |
| 6,977,630 | B1 * | 12/2005 | Donath et al. | 345/7 |
| 2005/0031168 | A1 * | 2/2005 | Katayama et al. | 382/104 |
| 2005/0149251 | A1 * | 7/2005 | Donath et al. | 701/200 |

(Continued)

FOREIGN PATENT DOCUMENTS

JP    A-2001-141824    5/2001
JP    A-2004-271513    9/2004

(Continued)

OTHER PUBLICATIONS

International Search Report dated Mar. 2, 2010 in International Patent Application No. PCT/JP2010-051260 (with translation).

*Primary Examiner* — Calvin Cheung
(74) *Attorney, Agent, or Firm* — Oliff & Berridge, PLC

(57) ABSTRACT

A representative point corresponding to geometry of the road on which the vehicle is traveling is calculated based on positional information on a stationary target detected by a radar, and based on positional information of the calculated representative points, left and right side corresponding straight lines that correspond to left and right side edges of the road are calculated. With one of the corresponding straight lines that has a most distal end more proximal to the vehicle than that of the other being set as a reference corresponding straight line, information on curving geometry of the road is detected based on positional information on a representative point within a process targeted area that is sandwiched between the left and the right side corresponding straight lines and extends in the traveling direction of the vehicle and is also distal to the most distal end of the reference corresponding straight line.

8 Claims, 7 Drawing Sheets

U.S. PATENT DOCUMENTS

| | | | |
|---|---|---|---|
| 2005/0251336 A1* | 11/2005 | Ihara et al. | 701/301 |
| 2006/0217886 A1* | 9/2006 | Fujimoto | 701/300 |
| 2007/0010937 A1 | 1/2007 | Sakuma | |
| 2007/0084655 A1* | 4/2007 | Kakinami et al. | 180/167 |
| 2007/0143004 A1 | 6/2007 | Sakuma | |
| 2009/0041300 A1* | 2/2009 | Mack | 382/103 |
| 2009/0080697 A1* | 3/2009 | Kishikawa et al. | 382/103 |
| 2010/0110193 A1* | 5/2010 | Kobayashi | 348/149 |

FOREIGN PATENT DOCUMENTS

| | | |
|---|---|---|
| JP | A-2005-172590 | 6/2005 |
| JP | A-2005-173917 | 6/2005 |
| JP | A-2006-38755 | 2/2006 |
| JP | A-2007-17338 | 1/2007 |
| JP | A-2007-161162 | 6/2007 |
| JP | A-2007-230267 | 9/2007 |

* cited by examiner

ROAD INFORMATION DETECTING DEVICE AND VEHICLE CRUISE CONTROL DEVICE

TECHNICAL FIELD OF THE INVENTION

The present invention relates to a device for detecting geometry of a road on which a vehicle is traveling, and a device for performing cruise control of the vehicle based on information on the detected road geometry.

BACKGROUND ART

Information on geometry of a road on which a vehicle is traveling may be employed to assist the vehicle's cruise either automatically or semi-automatically in a similar way to an ACC (Adaptive Cruise Control) system. For example, map information of a car navigation system mounted on the vehicle may be employed for recognition of geometry of the road on which the vehicle is traveling. However, since the map information of the car navigation system is typically recorded in a recording device installed on the vehicle, the information not necessarily reflects current status of the road. Also, since position detection accuracy of a GPS (Global Position System) employed in the car navigation system is relatively coarse as compared to width and curving geometry of the road, it is hard to say that the information is sufficient for cruise assistance.

In view of the foregoing, there have been some techniques developed that employ a radar device mounted on a traveling vehicle to detect geometry of a road on which the vehicle is traveling and employ information on the geometry of the road for cruise assistance. For example, as described in Patent Document 1, from among a plurality of points that are represented in a coordinate system based on factors such as distances and orientations of reflecting objects obtained as results of detections made by radio wave radars, a group of points that are close to each another are extracted, and if a length of a line that connects the points within this group is greater than or equal to a certain length, then the points are deemed to be reflecting targets that exist on a roadside and thus are recognized as the geometry of the road on which the vehicle is traveling.

PRIOR ART DOCUMENTS

Patent Documents
Patent Document 1: Japanese Patent Laid-Open Publication No. 2007-161162
Patent Document 2: Japanese Patent Laid-Open Publication No. 2007-17338
Patent Document 3: Japanese Patent Laid-Open Publication No. 2006-38755

SUMMARY OF THE INVENTION

Problem to be Solved by the Invention
In a system such as an ACC system that assists vehicle's cruise either automatically or semi-automatically, the speed of the vehicle may be controlled at a preset setting speed so long as a driver does not put on a brake. In such a case, the setting speed of the vehicle will be too large depending on geometry, especially curving geometry, of a road on which the vehicle is traveling, so that a brake operation by the driver will cancel out the operation of the ACC system. That is, in conventional techniques, since the adjustment of speed by the ACC system is not adapted to curving geometry, the ACC system is not capable of operating in an efficient way.

Also, in general, with respect to a stationary target that remains stationary at an entrance to a curve on the road on which the vehicle is traveling, the driver steers the vehicle along curvature (geometry) of the curve, so that the vehicle is considered less likely to collide against the object. However, if geometry of the road on which the stationary target exists is not previously recognizable, that is, if whether geometry of the road is curved or linear is not discriminable, then it is considered preferable to give some warning to the driver in order to give priority to safety and to always avoid collision of the vehicle, and in such a case, a warning will unnecessarily be issued even in the aforementioned case where the vehicle is less likely to collide.

The present invention is made in view of the aforementioned problems, and is purposed to detect information on curving geometry of a road on which a vehicle is traveling with high accuracy.

Means for Solving the Problem

In the present invention, in order to solve the aforementioned problem, corresponding straight lines of linear geometries that correspond to right and left edges of a road on which a vehicle is traveling and extend in a traveling direction on right and left sides of the vehicle are calculated, and then these right and left corresponding straight lines are employed to detect information that corresponds to curving geometry of the road. In this way, curving geometry of the road on which the vehicle is traveling can be recognized with high accuracy. Note that in the present specification, the vehicle's traveling direction may sometimes be referred to as a longitudinal direction, and a direction perpendicular to the longitudinal direction may sometimes be referred to as a transverse direction. Also, the terms "proximal" and "distal" are based on how far from the vehicle in the traveling direction (longitudinal direction). Therefore, the term "distal" indicates farther from the vehicle in the traveling direction (longitudinal direction) than "proximal".

In detail, the present invention relates to a road information detecting device mounted on a vehicle, the device comprising:

a representative point calculation module for calculating a representative point that corresponds to geometry of a road on which the vehicle is traveling, based on a received signal obtained by receiving a wave transmitted from a transmission antenna and reflected by a target and based on positional information on a stationary target located in a traveling direction of the vehicle;

a corresponding straight line calculation module for calculating at least one of a left side corresponding straight line that corresponds to a left side edge of the road and extends in the traveling direction of the vehicle and a right side corresponding straight line that corresponds to a right side edge of the road and extends in the traveling direction of the vehicle, based on positional information on a plurality of representative points detected by the representative point calculation module;

a reference corresponding straight line setting module for setting, among the corresponding straight lines calculated by the corresponding straight line calculation module, one corresponding straight line that has a most distal end more proximal to the vehicle than that of the other corresponding straight line as a reference corresponding straight line; and a curve information detecting module for, in case where the left side corresponding straight line and the right side corresponding straight line were calculated by the corresponding straight line calculation module, detecting information on curving geometry of the road based on positional information on a representative point calculated in a process targeted area by the representative point calculation module, the process targeted area being an area that is sandwiched between the left side corresponding straight line and the right side corresponding straight line and extends in the traveling direction of the vehicle and is also distal to the most distal end of the reference corresponding straight line.

In the road information detecting device according to the present invention, the detection of information on curving geometry of the road is performed by employing positional information on a representative point calculated by the representative point calculation module. The representative point to be calculated by the representative point calculation module is such a point that corresponds to geometry of the road and is created based on a result of receiving a wave reflected by a target. Various conventional techniques for calculation are applicable to the calculation of representative point in the present invention. Preferably, a plurality of stationary targets that correspond to the received reflected waves can be collected and grouped under a given condition, and then a point that is calculated so as to averagely reflect positional information on the stationary targets contained in the group can be adopted as the representative point. By applying such a grouping procedure and thereby calculating the representative point, the effect of error included in the positional information of each stationary target can be mitigated, and thus more accurate recognition of geometry of the road can be realized. Also, as for the aforementioned averaging of the positional information on the stationary targets that is performed for the calculation of representative point, positional error included in the representative point can be reduced further by applying a procedure such as a weighting procedure under a given condition.

Here, the corresponding straight line calculation module employs the calculated representative points to calculate right side and left side corresponding straight lines that extend along the traveling direction of the vehicle. These corresponding straight lines are straight lines that virtually correspond to right side and left side edges of the road and are calculated under an assumption that the road on which the vehicle is currently placed extends in a linear manner. Furthermore, since the corresponding straight lines are calculated depending on the calculated representative points, they are straight lines of finite lengths. Then, with respect to the right side and left side corresponding straight lines calculated by the corresponding straight line calculation module, the reference corresponding straight line setting module sets one of the corresponding straight lines as a reference corresponding straight line, based on the aforementioned given condition provided for the effective calculation of curving geometry of the road. Therefore, the reference corresponding straight line is a corresponding straight line to be employed as reference information in the detection of curve information by the curve information detecting module. Note that if only one of the corresponding straight lines was calculated by the corresponding straight line calculation module, then the calculated corresponding straight line is set to be the reference corresponding straight line.

Then, in case where a representative point is calculated by the representative point calculating module in a process targeted area that is defined based on the right side and left side corresponding straight lines and on positional information on the most distal end of the reference corresponding straight line, the curve information detecting module detects information on curving geometry of the road based on positional information on the calculated representative point. In other words, since the process targeted area is an area that is sandwiched between the right side and left side corresponding straight lines, the area extends in the traveling direction of the vehicle, and since the area is also located distal to the most distal end of the reference corresponding straight line, if there is a possibility that the road which the vehicle is traveling shifts from a linear portion to a curving portion, then a position at which the curving portion starts may be contained within the area. Therefore, if any representative point was calculated in this process targeted area, then the calculated representative point is considered to be reflecting geometry of the road that goes off the linear traveling direction of the vehicle and makes a curve. Therefore, the curve information detecting module can detect information on curving geometry of the road based on the calculated representative point.

As seen from above, the road information detecting device of the present invention can adequately detect information on geometry of the road on which the vehicle is traveling, especially information on curving geometry, by employing the representative point calculated by the representative point calculation module.

Here, in the aforementioned road information detecting device, the curve information detecting module may be configured to detect information on curving geometry of the road based on positional information on the most distal end of the reference corresponding straight line, in addition to the positional information on the representative point in the process targeted area. Since the information on curving geometry of the road detected by the curve information detecting module is assumed to indicate that the curving portion of the road starts at a point more distal to the most distal end of the reference corresponding straight line, it is possible to grasp the starting point of the curving geometry of the road more adequately by taking the positional information on the most distal end of the reference corresponding line into consideration.

Here, in the road information detecting device described hereinabove, in case where a most proximal end of a non-reference corresponding straight line, which is a line not being the reference corresponding straight line among the left side corresponding straight line and the right side corresponding straight line calculated by the corresponding straight line calculation module, is located distal to the most distal end of the reference corresponding straight line, the curve information detecting module may be configured to detect information on curving geometry of the road based on positional information on a representative point calculated in the process targeted area by the representative point calculation module, the process targeted area being an area that is sandwiched between the left side corresponding straight line and the right side corresponding straight line and extends in the traveling direction of the vehicle and is also located distal to the most distal end of the reference corresponding straight line and proximal to the most proximal end of the non-reference corresponding straight line.

In case where the most proximal end of the non-reference corresponding straight line is located distal to the most distal end of the reference corresponding straight line, since the reference corresponding straight line and the non-reference corresponding straight line are significantly out of alignment from each other, there is a high possibility that the non-reference corresponding straight line that is located distal to the vehicle has not adequately grasped actual edge of the road. Therefore, as for the process targeted area to be used by the curve information detecting module for the detection of information on curving geometry of the road, more adequate detection of information on curving geometry can be realized by limiting the area to an area that is sandwiched between the left side corresponding straight line and the right side corresponding straight line and is also located distal to the most distal end of the reference corresponding straight line and proximal to the most proximal end of the non-reference corresponding straight line.

Although there is a possibility that the non-reference corresponding straight line has not adequately grasped actual edge of the road as mentioned above, however, the positional information on the most proximal end of the non-reference corresponding straight line may also be available as boundary information on curving geometry of the road. In light of the fact that the more the positional information associated with curving geometry, the more adequately the curving geometry can be recognized, the curve information detecting module may alternatively be configured to detect information on curving geometry of the road based on positional information on the most proximal end of the non-reference corresponding straight line in addition to the positional information on the representative point in the process targeted area.

Similarly, since there is a possibility that the non-reference corresponding straight line has not adequately grasped actual edge of the road, in case where information on curving geometry of the road was detected by the curve information detecting module, information on an edge of the road associated with the non-reference corresponding straight line may be prohibited from being used as information on geometry of the road. In this way, incorrect recognition of geometry of the road can be avoided.

Here, in the road information detecting device described hereinabove, there may be some cases where only one of the left side corresponding straight line and the right side corresponding straight line was calculated by the corresponding straight line calculation module. In such a case, the reference corresponding straight line setting module may set the calculated corresponding straight line as the reference corresponding straight line, as mentioned above. Then, the curve information detecting module may detect information on curving geometry of the road based on positional information on a representative point calculated in a process targeted area by the representative point calculation module, the process targeted area being an area that is sandwiched between a virtual corresponding straight line and the reference corresponding straight line and extends in the traveling direction of the vehicle and is also distal to the most distal end of the reference corresponding straight line, the virtual corresponding straight line being a line at a first given distance away from the reference corresponding straight line to the side of the other corresponding straight line among the left side corresponding straight line and the right side corresponding straight line which was not calculated by the corresponding straight line calculation module. The first given distance may be a distance that is equivalent to an ordinary width of the road, or may be a fixed value, or may be a width value of the road obtained from map information of a car navigation system. With such a configuration, information on curving geometry of the road can be detected even in case where only one of the left side corresponding straight line and the right side corresponding straight line was calculated.

Here, in the detection of information on curving geometry of the road by the curve information detecting module in the road information detecting device described hereinabove, even a representative point calculated in the process targeted area by the representative point calculation module, positional information on a representative point that is located more than a second given distance away from the most distal end of the reference corresponding straight line along the traveling direction of the vehicle and is also located within a third given distance in the transverse direction with respect to the reference corresponding straight line may not be used. Since such a representative point that is located more than the second given distance away from the most distal end of the reference corresponding straight line along the traveling direction of the vehicle and is also located within the third given distance in the transverse direction with respect to the reference corresponding straight line is a point that is located approximately on an extension of the reference corresponding straight line, it is unlikely that such a representative point actually is a representative point that reflects curving geometry of the road. Therefore, it is preferable that such a representative point is not provided to the procedure to be performed by the curve information detecting module, such that it will not be reflected to the detection of curving geometry of the road. Note that the aforementioned second given distance and third given distance may be set as appropriate as long as they remain consistent with the technical thoughts described above.

Here, in the detection of information on curving geometry of the road by the curve information detecting module in the road information detecting device described hereinabove, even a representative point calculated in the process targeted area by the representative point calculation module, positional information on a representative point that is located more than a fourth given distance away from a most proximal representative point along the traveling direction of the vehicle may not be used. That is, it is unlikely that such a representative point that is located more than the fourth given distance away from the most proximal representative point toward the distal side actually is a representative point that reflects curving geometry of the road. Therefore, it is preferable that such a representative is not provided to the procedure to be performed by the curve information detecting module, such that it will not be reflected to the detection of curving geometry of the road. Note that the aforementioned fourth given distance may be set as appropriate as long as it remains consistent with the technical thoughts described above.

As seen from above, by employing a representative point calculated by the representative point calculation module, the road information detecting device according to the present invention can adequately detect information on curving geometry of the road on which the vehicle is traveling. And, by employing this detected information in cruise control of the vehicle, an operation of the vehicle can be controlled appropriately according to curving geometry of the road. That is, the vehicle cruise control device, which acquires road information from the road information detecting device described hereinabove and performs cruise control of the vehicle, performs cruise control of the vehicle based on at least one of distance from the vehicle to a curve starting point of the road and curving size of the road, among the information on curving geometry of the road detected by the curve information detecting module.

Effect of the Invention

It is therefore possible to detect information on curving geometry of a road on which a vehicle is traveling with high accuracy.

BEST MODE FOR EMBODYING THE INVENTION

A road information detecting device according to an embodiment of the present invention, and a vehicle cruise control device for performing cruise control of a vehicle and a vehicle safety control device for performing safety control of the vehicle by employing information detected by the road information detecting device are described below with reference to the drawings. Note that the configuration of the following embodiment is merely illustrative and the present invention is not limited by the configuration of this embodiment.

Figure 1:
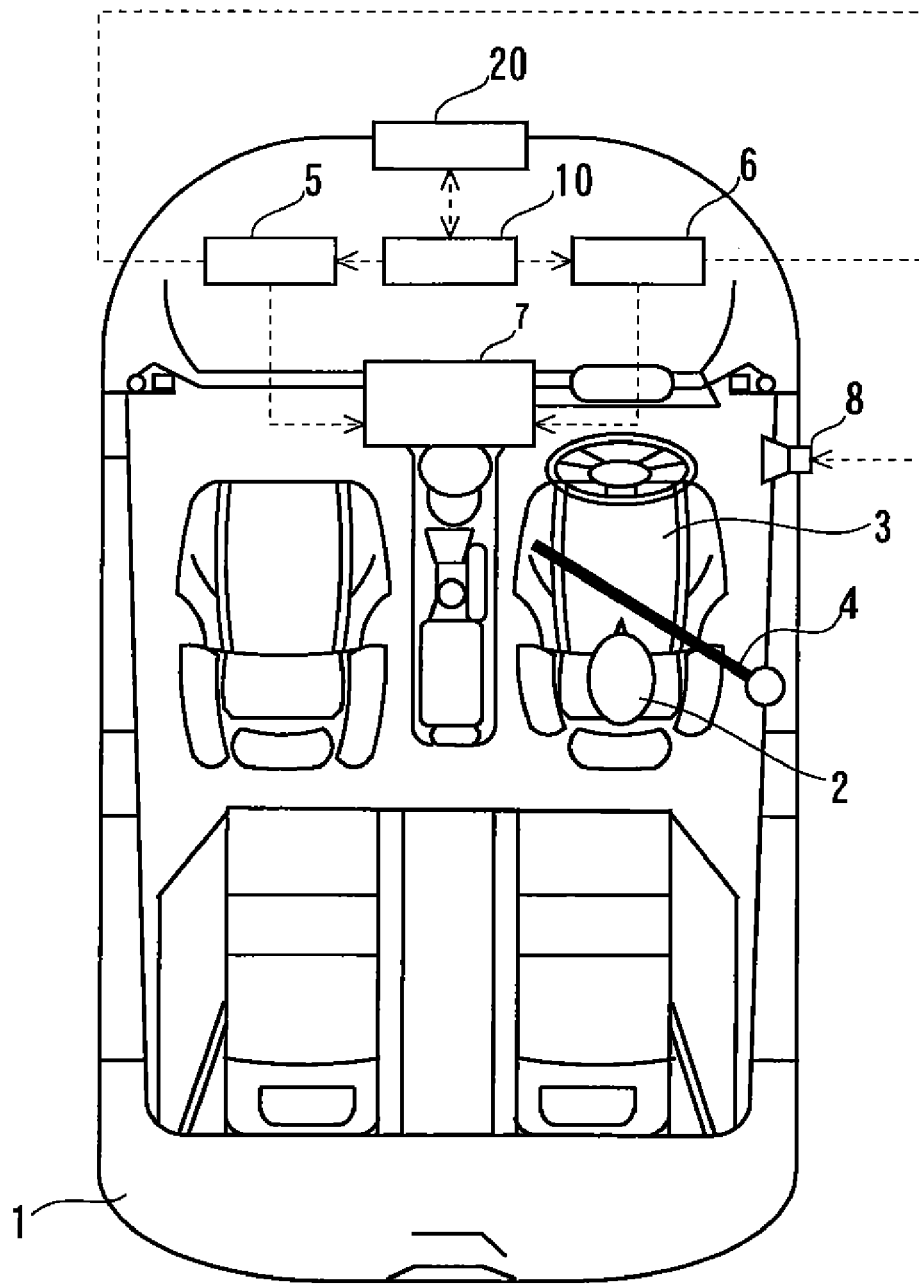
FIG. 1 is a diagram showing a schematic configuration of a vehicle on which a road information detecting device according to the present invention is mounted.

FIG. 1 shows a schematic configuration of a vehicle 1 on which the aforementioned road information detecting device is mounted. The vehicle 1 is provided with four seats, and is shown with a driver 2 seated on a driver's seat 3 in FIG. 1. Further, the driver 2 can ensure his/her own safety while driving by using a seatbelt 4 provided for the driver's seat 3. Note that a so-called vehicle-mounted machine is installed in a panel area on the left front side of the driver's seat 3, and among components of the vehicle mounted machine, a display 7 for displaying information is shown in FIG. 1. The vehicle-mounted machine is an information processing device for playing music within the vehicle 1, for executing car navigation based on map information in a recording device and signals detected by a GPS (Global Positioning System) device, where both devices being provided separately from the vehicle-mounted machine, and the like. The display 7 of the vehicle mounted machine is a device for displaying information processed by the vehicle-mounted machine to the driver 2 and to any other passenger when needed.

Note that the vehicle 1 shown in FIG. 1 is mounted with a radar device 20 that is capable of transmitting from its transmission antenna a millimeter wave covering an anterior traveling direction of the vehicle 1 within its detection range, receiving a reflected wave reflected by a target outside the vehicle, and detecting information on position of the target relative to the vehicle 1. Also provided is a road information detecting device 10 that employs the result of detection by this radar device 20 to detect information on geometry of a road on which the vehicle 1 is traveling and extending in the traveling direction of the vehicle 1. Furthermore, although the information on geometry of the road detected by the road information detecting device 10 may be employed by various control devices within the vehicle 1, however, in the present embodiment, a vehicle safety control device 5 and a vehicle cruise control device 6 are illustrated as the control devices. Note that in these control devices, not only the result of detection by the road information detecting device 10 but also the result of detection by the radar device 20 can be employed.

The vehicle safety control device 5 is a control device for executing safety control with respect to the vehicle 1, especially for executing control in relation to physical safety of the driver 2 i.e. a driver while driving. One example of the safety control includes calling the driver 2's attention if an obstacle was detected in the traveling direction of the vehicle 1 based on the result of detection by the radar device 20. Examples of specific ways for calling for attention include: announcing an alarm by means of video and/or audio via the display 7 and/or a speaker in the vehicle 1; causing a force to act on the driver 2 via the seatbelt 4 worn by the driver 2; causing a brake to act so as to reduce the speed of the vehicle 1 by such a little amount not affecting on traveling state of the vehicle; and various other ways that have conventionally been employed.

Further, the vehicle cruise control device 6 is a control device that executes cruise control of the vehicle 1. Examples of the cruise control include: control for keeping an inter-vehicle distance with another vehicle traveling anterior to the vehicle 1 greater than or equal to a certain distance at which safety is attained; control for, if there is no vehicle traveling anterior to the vehicle 1, keeping the speed of the vehicle 1 to a preset vehicle speed even if the driver 2 is not stepping on an acceleration pedal; and the like. Note that in the latter case, a brake operation by the driver 2 at any timing will forcibly cancel the control for keeping the vehicle at a constant speed and decelerate the vehicle immediately.

Figure 2:
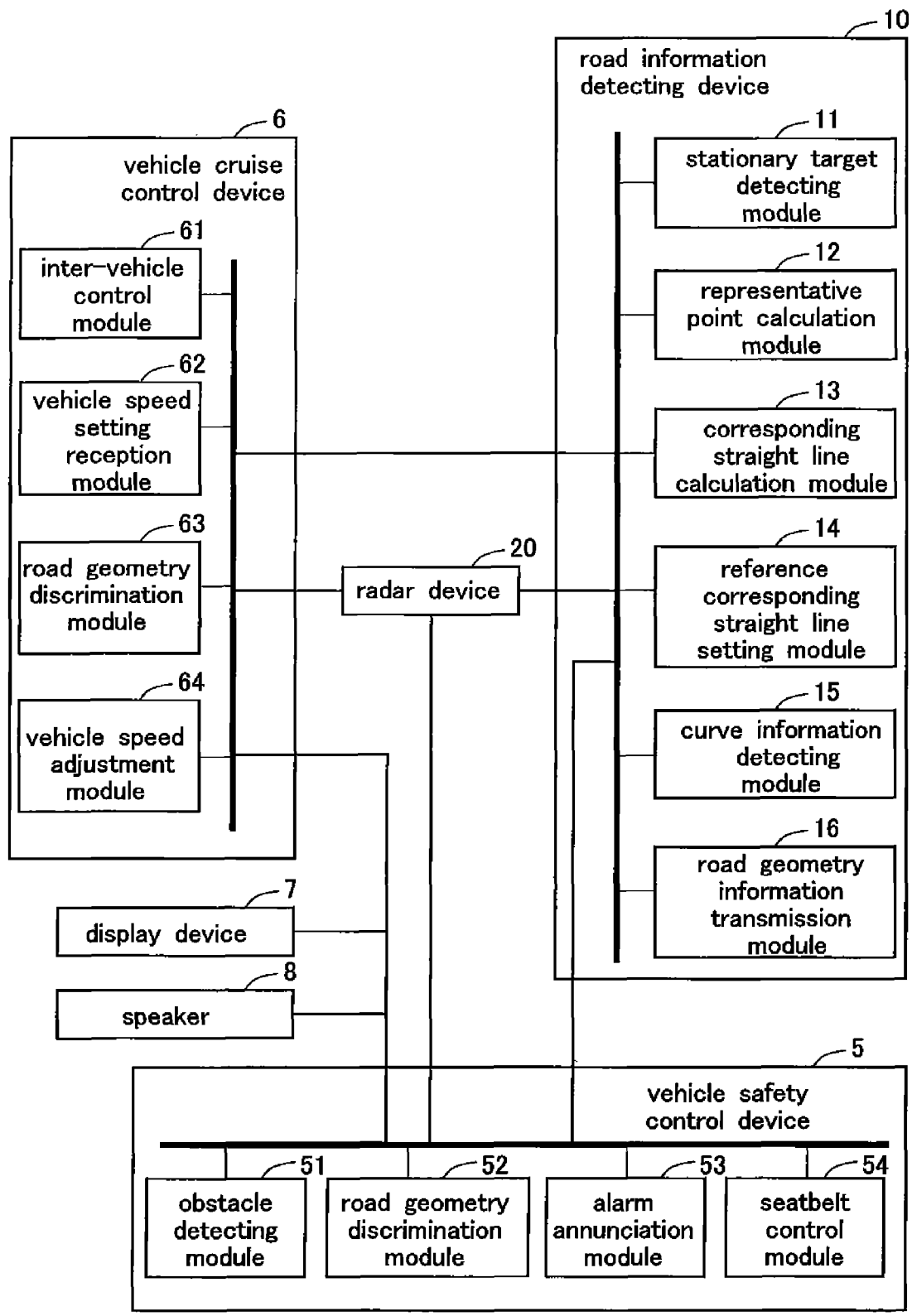
FIG. 2 is an illustration representing, via functional blocks, a correlation between the road information detecting device according to the present invention, and a vehicle safety control device and a vehicle cruise control device operating in corporation therewith.

Although various controls are executed by the vehicle safety control device 5 and the vehicle cruise control device 6 in order to achieve the given purposes, however, in the vehicle 1 shown in FIG. 1, the information on geometry of the road detected by the road information detecting device 10 may be employed in each of the controls by these control devices, which allows the controls by the respective control devices to be executed more effectively. Therefore, FIG. 2 shows, as a functional block diagram, a correlation between the road information detecting device 10, the vehicle safety control device 5, and the vehicle cruise control device 6, by employing functional blocks by which the controls in the respective control devices are imaged. Each control device is substantially equivalent to a computer that contains CPU, memory, hard disc, and the like, and control programs are executed therein to achieve functions of the respective functional blocks shown in FIG. 2.

As shown in FIG. 2, the road information detecting device 10 has functional modules of: a stationary target detecting module 11; a representative point calculation module 12; a corresponding straight line calculation module 13; a reference corresponding straight line setting module 14; a curve information detecting module 15; and a road geometry information transmission module 16. These functional modules are merely illustrative, and the road information detecting device 10 may also have additional functional module(s) other than these functional modules in order to achieve the given purposes. Outlines of these functional modules are described below. The stationary target detecting module 11 is a functional module for detecting a stationary target that exists in the traveling direction of the vehicle 1, by employing the result of detection by the radar device 20. Although a structural object or the like that is located along a side portion of the road and has positional information in which geometry of the road is reflected is supposed to be the stationary target, however, any stationary target that exists in the traveling direction of the vehicle 1 may be detected by the stationary target detecting module 11. The representative point calculation module 12 is a functional module for calculating a representative point representative of a plurality of stationary target, based on the positional information detected by the stationary target detecting module 11. Since the positional information on the plurality of stationary targets are reflected in this representative point, it is believed that errors contained in the positional information of the respective stationary targets can be balanced out and the representative point can have positional information that reflects geometry of the road more adequately.

The corresponding straight line calculation module 13 is a functional module for calculating right side and left side corresponding straight lines that correspond to right and left edges of the road on which the vehicle 1 is traveling. Although the corresponding straight lines indicate in which direction the road is extending by using present location and orientation of the vehicle 1 as an origin, however, the lines do not always represent geometry of the road adequately. Although it is preferable that the corresponding straight line calculation module 13 calculates one corresponding straight line for each of the right and left edges of the road, however, it may be sufficient if at least one of the right side and left side corresponding straight lines is calculated. Next, the reference corresponding straight line setting module 14 is a functional module for setting, among the corresponding straight lines calculated by the corresponding straight line calculation module 13, one corresponding straight line that satisfies a given condition as a reference corresponding straight line. The given condition is used to select a corresponding straight line to be used by the curve information detecting module 15 for the detection of curving geometry of the road as described below.

The curve information detecting module 15 is a functional module for detecting information on curving geometry of the road, based on the reference corresponding straight line set by the reference corresponding straight line setting module 14, the representative point calculated by the representative point calculation module 12, and the like. The road geometry information transmission module 16 is a functional module for transmitting information on geometry of the road such as the information on curving geometry of the road detected by the curve information detecting module 15, the information on geometry of the straight portion of the road, and the like, to the vehicle safety control device 5 and the vehicle cruise control device 6 connected to the road information detecting device 10, and for providing these information for the controls to be executed in the respective devices.

Details of the functions of the respective functional modules of the road information detecting device 10 described above will be discussed later based on FIGS. 3 through 7. Next, functional modules of the vehicle safety control device 5 are described. The vehicle safety control device 5 has functional modules of: an obstacle detecting module 51; a road geometry discrimination module 52; an alarm annunciation module 53; and a seatbelt control module 54. These functional modules are merely illustrative, and the vehicle safety control device 5 may also have additional functional module(s) other than these functional modules in order to achieve the given purposes. Outlines of these functional modules are described below. The obstacle detecting module 51 is a functional module for detecting an obstacle that exists in the traveling direction of the vehicle 1, based on the result of detection by the radar device 20. Note that the technique for detecting an obstacle by using the radar device 20 is already public and thus is not described in detail herein.

In the vehicle safety control device 5, controls for securing safety of the driver 2 are executed by the alarm annunciation module 53 and the seatbelt control module 54, based on a judgment on whether or not the obstacle detected by the obstacle detecting module 51 may be a threat to the traveling of the vehicle 1. The alarm annunciation module 53 is a functional module for announcing an alarm for urging the driver 2 to acknowledge the existence of the obstacle by means of the display 7 and/or the speaker 8 within the vehicle 1, and the seatbelt control module 54 is a functional module for calling the driver 2's attention via the seatbelt 4, also for urging the driver 2 to acknowledge the existence of the obstacle. When the controls are executed by the alarm annunciation module 53 and the seatbelt control module 54, the result of discrimination by the road geometry discrimination module 52 is employed so that the controls for ensuring driver 2's safety can be executed more effectively. The road geometry discrimination module 52 is a functional module for discriminating geometry of the road on which the vehicle 1 is traveling, based on the information transmitted by the road geometry information transmission module 16 of the road information detecting device 10. Details of safety control for the vehicle 1 to be executed by the vehicle safety control device 5 via the road geometry discrimination module 52 will be described later.

Next, functional modules of the vehicle cruise control device 6 are described. The vehicle cruise control device 6 has functional modules of: an inter-vehicle distance control module 61; a vehicle speed setting reception module 62; a road geometry discrimination module 63; and a vehicle speed adjustment module 64. These functional modules are merely illustrative, and the vehicle cruise control device 6 may also have additional functional module (s) other than these functional modules in order to achieve the given purposes. Outlines of these functional modules are described below. The inter-vehicle distance control module 61 is a functional module for keeping an inter-vehicle distance with a vehicle traveling anterior to the vehicle 1 at a certain distance at which safety of the vehicle 1 is attained, based on the result of detection by the radar device 20. Note that the technique for keeping a certain inter-vehicle distance by using the radar device 20 is already public and thus is not described in detail herein.

In the vehicle cruise control device 6, if there is another vehicle existing anterior to the vehicle 1, the speed of the vehicle 1 is controlled by the inter-vehicle distance control module 61 such that the inter-vehicle distance becomes greater than or equal to the aforementioned certain distance. On the other hand, if there is no vehicle existing anterior to the vehicle 1, or even though there is such a vehicle, if the inter-vehicle distance is large enough such that collision is much less likely to occur, then the inter-vehicle distance control module 61 causes the vehicle 1 to travel at a preset traveling speed (hereinafter referred to as "setting speed"). The vehicle speed setting reception module 62 is a functional module for receiving this setting speed in advance. Note that if the driver 2 makes a brake operation while the vehicle 1 is being driven at this setting speed, then the brake operation is given priority and the vehicle 1 is decelerated.

When such control is executed by the inter-vehicle distance control module 61, the result of discrimination by the road geometry discrimination module 63 is employed such that the control for keeping the inter-vehicle distance and the vehicle speed can be executed more effectively. As with the road geometry discrimination module 52, the road geometry discrimination module 63 is a functional module for discriminating geometry of the road on which the vehicle 1 is traveling, based on the information transmitted by the road geometry information transmission module 16 of the road information detecting device 10. The vehicle cruise control device 6 is configured such that the speed of the vehicle 1 is adjusted by the vehicle speed adjustment module 64 by employing the result of discrimination by the road geometry information discrimination module 63, the details of which will be discussed later.

Figure 3:
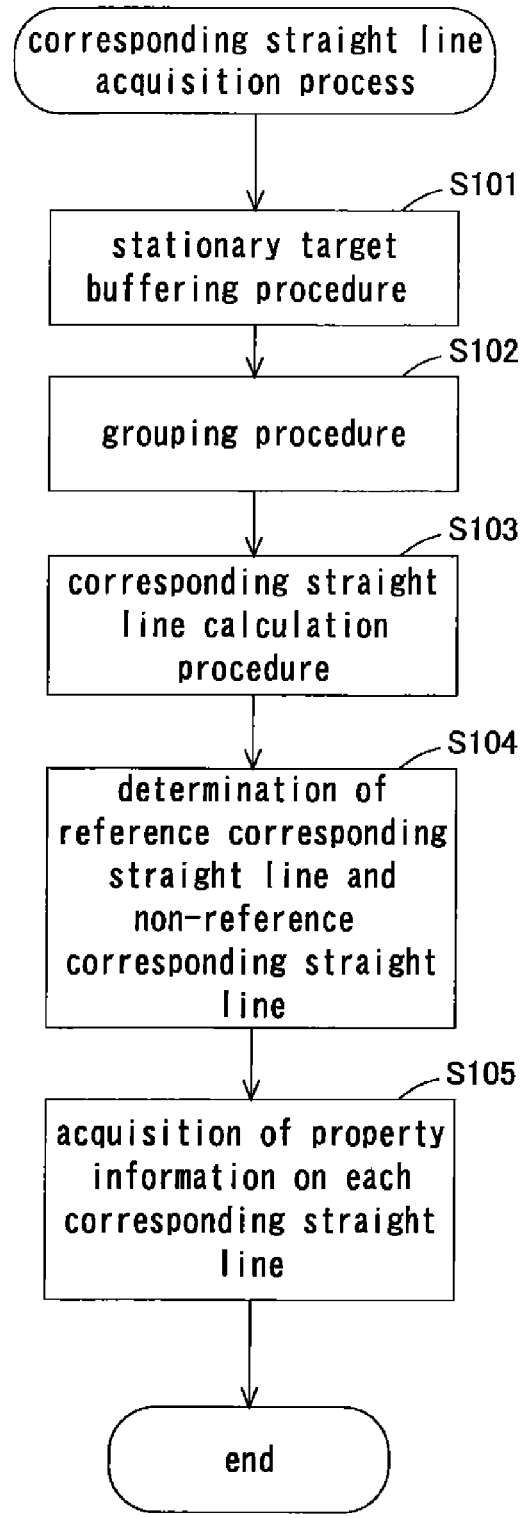
FIG. 3 is a flowchart relating to a corresponding straight line acquisition process that is executed by the road information detecting device according to the present invention.
Figure 4:
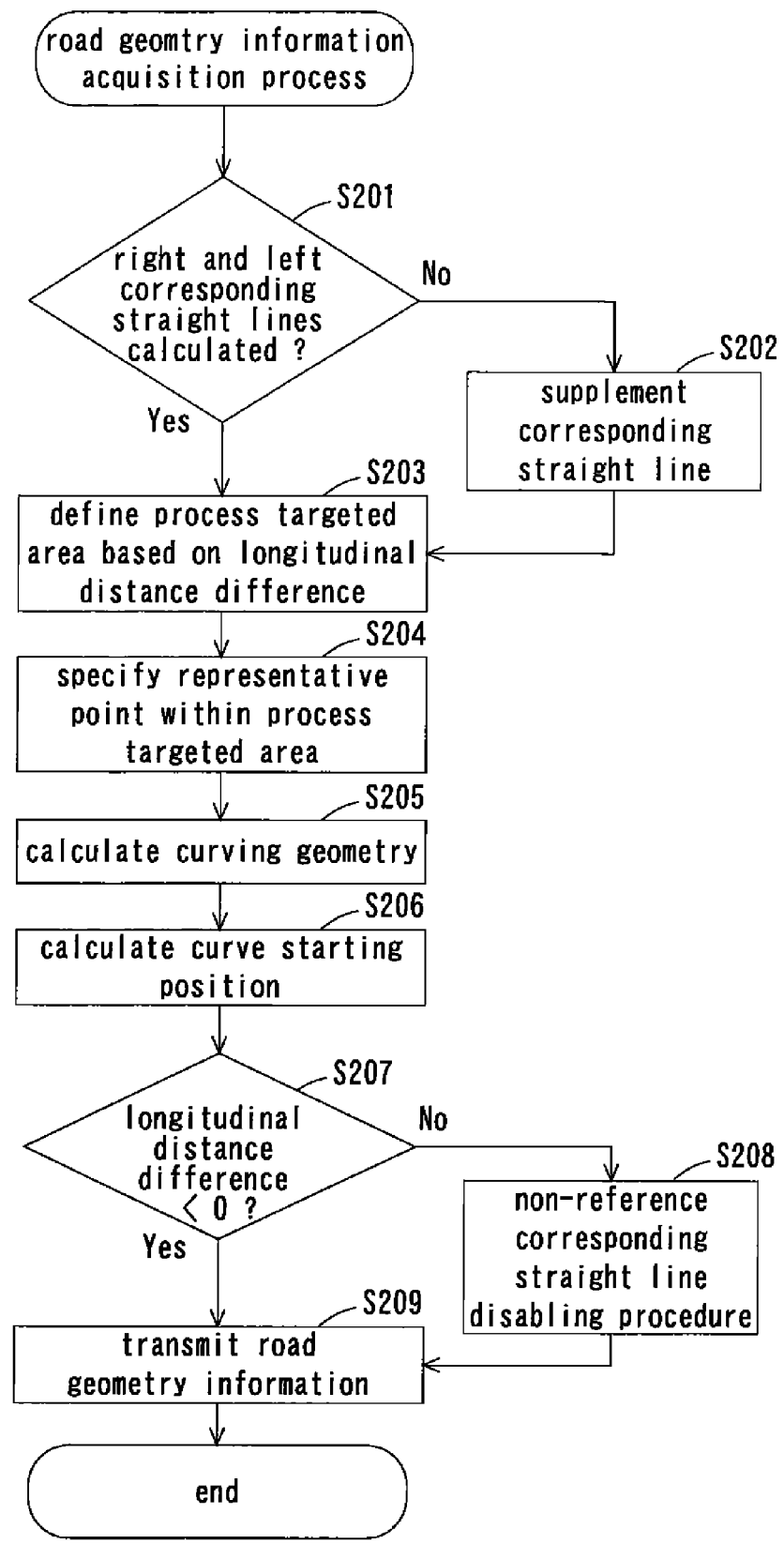
FIG. 4 is a flowchart relating to a road geometry information acquisition process that is executed by the road information detecting device according to the present invention.

Now, control for detecting information on road geometry by the road information detecting device 10 is described based on FIG. 3 and FIG. 4. FIG. 3 is a flowchart of a corresponding straight line acquisition process that makes up a part of the control for information detection, and FIG. 4 is a flowchart of a road geometry information acquisition process that is executed after the corresponding straight line acquisition process. Processes shown in FIG. 3 and FIG. 4 are respectively realized by control programs that are executed by a computer implemented within the road information detecting device.

First, the corresponding straight line acquisition process is described. In S101, positional information on a stationary target obtained via the radar device 20 is buffered (stored) by the stationary target detecting module 11 for several times. That is, positional information on a stationary target, which is obtained based on a reflected wave from a stationary target for every one transmission of a wave from the radar device 20, is buffered within a memory of the road information detecting device 10 for several transmissions of waves. Waves reflected by targets may include a reflected wave from a moving target in addition to that from the stationary target. Therefore, any moving body such as an approaching moving body that is approaching the vehicle 1, a receding moving body that is receding from the vehicle 1, and furthermore, a moving body that was moving in the past but not moving recently, is judged as not falling under category of stationary target and is excluded from the buffering procedure in S101. Since a structural body located along geometry of the road is employed for the detection of geometry of the road, excluding the existence of moving body as mentioned above from the result of detection by the radar device 20 allows for more accurate recognition of geometry of the road. Note that this exclusion of moving body is essentially performed in the road information detecting device 10, and is not necessarily executed when the result of detection by the radar device 20 is employed in the vehicle safety control device 5 and the vehicle cruise control device 6.

With respect to the positional information of the stationary target buffered in the memory, a correction procedure is performed as needed based on the steering angle and the vehicle speed of the vehicle 1's travel, such that information after the correction represents positional information after the vehicle's movement. The correction procedure is a procedure for reflecting, to the positional information of the stationary target, the fact that the vehicle 1 changes its position along with the vehicle's travel every time the position is detected by the radar device 20. Once the procedure of S101 is done, the process proceeds to S102.

In S102, a grouping procedure is performed by the representative point calculation module 12 with respect to each stationary target, based on the positional information of the stationary target calculated in S101, and a representative point representative of stationary targets within in each group is calculated. Specifically, in the traveling direction of the vehicle 1, a given range (for example, a rectangular range of Y1 (m) in the traveling direction and ±X1 (m) in the transverse direction (direction perpendicular to the traveling direction, hereinafter referred to so) is set in a form of matrix, and number of stationary targets within each given range is counted. For a given range having a count number greater than a given number N1, a representative point that corresponds to the given range is calculated by computing a centroid of the stationary targets based on the positional information of the stationary targets within the range. By calculating the representative point in this way, the effect of the positional information of any temporary or accidentally detected stationary target and the effect of error included in the positional information of each stationary target can be reduced, so that the detection of information on road geometry can be performed based on the stationary targets that surely exist.

For the counting of stationary targets in the aforementioned grouping procedure, various methods can be employed in order to improve accuracy of the counting. For example, as for a stationary target that existed in the previous counting and a stationary target that has been recognized its existence for the first time in the current counting, the counting may be performed with more weight on the former. This is because the former is more likely to exist actually. In addition, if the radar device 20 is a device that is switchable between a mode of detection in a high cycle but with a low resolution and a mode of detection in a low cycle but with a high resolution, weighting the counting of stationary targets that were detected in each mode allows for more accurate detection of stationary target. Once the procedure of S102 is done, the process proceeds to S103.

In S103, corresponding straight lines that correspond to right and left edges of the road are calculated by the corresponding straight line calculation module 13, based on the representative points calculated by the grouping procedure of S102. Specifically, for each representative point starting from the one closest to the vehicle 1 along the traveling direction of the vehicle 1, a rectangular connection range of Y2 (m) in the traveling direction and ±X2 (m) in the transverse direction with the representative point at the center is provided, and if a connection range with one representative point at the center has another representative point therein, then the representative points are deemed to have a "relationship to be connected". This may be repeated sequentially for every other representative point, and if number of representative points to be in the "relationship to be connected" is greater than or equal to a given number N2, then a fitted straight line for these representative points is calculated by using the method of least squares.

Then, if the calculated fitted straight line has an orientation falling within a given angular range with respect to the traveling direction of the vehicle 1 and has a length greater than or equal to a given length L1, then the fitted straight line is deemed to be a straight line that corresponds to an edge of the road and reflects linear geometry thereof to some extent. Therefore, if this condition is satisfied, then an average value of the transverse positions of the points making up the fitted straight line is calculated as an average transverse position of the fitted straight line. This means that this average transverse position of the fitted straight line becomes a parameter for determining whether the calculated fitted straight line is located to the left or to the right of the vehicle 1. For example, suppose transverse position information for the left side has a negative value and transverse position information for the right side has a positive value, if the average transverse position of the fitted straight line has a sign of negative, then the fitted straight line is determined to be a left side corresponding straight line, whereas if the average transverse position of the fitted straight line has a sign of positive, then the fitted straight line is determined as a right side corresponding straight line. If there are a plurality of fitted straight lines having average transverse positions of the same sign, then among these fitted straight lines, the one having an average transverse position of a smallest absolute value i.e. the one that is closest to the vehicle 1 is determined to be a right side or left side corresponding straight line. Once the procedure of S103 is done, the process proceeds to S104.

In step S104, a determination of a reference corresponding straight line and a non-reference corresponding straight line is performed by the reference corresponding straight line setting module 14, with respect to the corresponding straight lines calculated in S103. Here, the reference corresponding straight line is defined as, among the right side and left side corresponding straight lines, a corresponding straight line that has a most distal end closer to the vehicle 1 than that of the other line. The fact that the most distal end is closer to the vehicle 1 indicates that, farther away from the most distal end, there is a possibility that the road on which the vehicle 1 is traveling changes from straight line geometry, that is, makes a curve. Therefore, in the road information detecting device 10, the detection of curving geometry of the road on which the vehicle 1 is traveling is performed by using the reference corresponding straight line i.e. the corresponding straight line that has the most distal end closer to the vehicle 1, as a reference. In addition, the remaining corresponding straight line that was not determined to be the reference corresponding straight line is regarded as the non-reference corresponding straight line. Note that if only the left side or right side corresponding straight line was calculated in the procedure of S103, the calculated corresponding straight line is treated as the reference corresponding straight line, with no non-reference corresponding straight line existing. Once the procedure of S104 is done, the process proceeds to S105.

In S105, property information associated with the right and left corresponding straight lines calculated in S103 is obtained. In the present embodiment, the property information may include: a length of each corresponding straight line in the traveling direction of the vehicle 1; and a longitudinal distance difference between these corresponding straight lines (a distance difference in the traveling direction of the vehicle 1) Ld. Here, the longitudinal distance difference Ld is defined as follows:
(1) in case where the left side corresponding straight line is the reference corresponding straight line, then longitudinal distance difference Ld=longitudinal position of most proximal end of right side corresponding straight line (non-reference corresponding straight line)–longitudinal position of most distal end of left side corresponding straight line (reference corresponding straight line)
(2) in case where the right side corresponding straight line is the reference corresponding straight line, then longitudinal distance difference Ld=longitudinal position of most proximal end of left side corresponding straight line (non-reference corresponding straight line)–longitudinal position of most distal end of right side corresponding straight line (reference corresponding straight line)

That is, the longitudinal distance difference is a parameter that represents a correlation between the respective corresponding straight lines, in the traveling direction of the vehicle 1.

In S105, road width of the road on which the vehicle 1 is traveling is calculated as the afore-mentioned property, by using a difference between the transverse position of the right side corresponding straight line and the transverse position of the left side corresponding straight line.

After the procedure of S105, the corresponding straight line acquisition process shown in FIG. 3 ends.

Next, the road geometry information acquisition process is described. Note that in the process, procedures of S201 through S208 are executed by the curve information detecting module 15; whereas a procedure of S209 is executed by the road geometry information transmission module 16. In S201, a judgment is made on whether or not both the right side and left side corresponding straight lines were calculated in the afore-mentioned corresponding straight line acquisition process. An affirmative acknowledgement here leads to S203; whereas a negative acknowledgement leads to S202. If the process proceeds to S202, then a supplement of corresponding straight line is performed for the side for which no corresponding straight line was calculated. For example, in case where only the left side corresponding straight line was calculated, a corresponding straight line equivalent to the right side corresponding straight line is supplemented; whereas in case where only the right side corresponding straight line was calculated, a corresponding straight line equivalent to the left side corresponding straight line is supplemented. As for the supplement of corresponding straight line, a straight line, which is located parallel to and at a given distance L2 away from the corresponding straight line on the side for which the corresponding straight line was calculated to the side for which no corresponding straight line was calculated and has a same length as the calculated corresponding straight line, is supplemented as a supplementary corresponding straight line. Here, the given distance L2 is preferably a value that depends on an assumed width of the road on which the vehicle 1 is traveling. In addition, if the vehicle-mounted machine mounted on the vehicle 1 has a car navigation system, then the width value of the road may be acquired from map information used in the system and may be employed as the given distance L2. Once the procedure of S202 is done, the process proceeds to S203.

In S203, a definition of process targeted area to be used for the acquisition of information on curving geometry of the road is performed, based on the longitudinal distance difference Ld acquired in S105. In the present embodiment, a condition for the definition of process targeted area is different between a case where the longitudinal distance difference Ld is zero or negative (hereinafter referred to as "Case 1") and a case where the longitudinal distance difference Ld is positive (hereinafter referred to as "Case 2").

Figure 5:
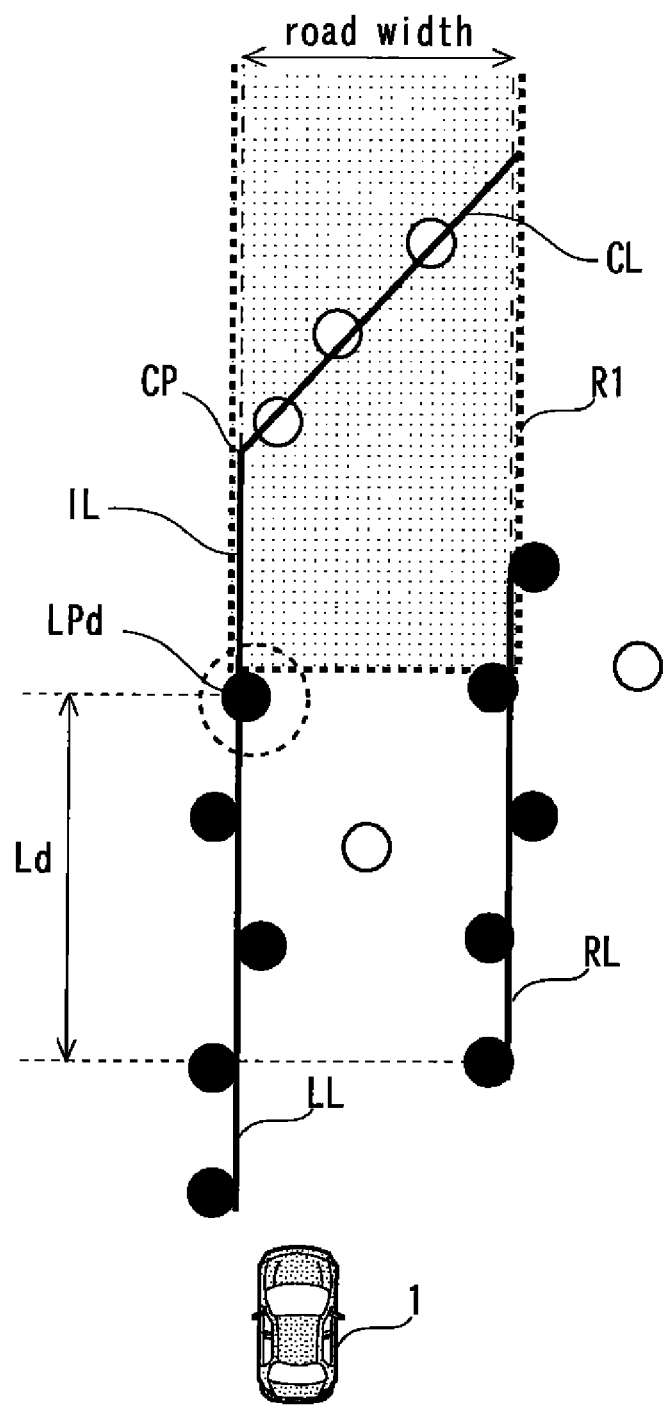
FIG. 5 is a first diagram showing a correlation between a vehicle, corresponding straight lines, and representative points at the time of execution of the road geometry information acquisition process shown in FIG. 4.

First, the definition of process targeted area in Case 1 is described based on FIG. 5. FIG. 5 is a diagram showing a correlation between the vehicle 1, the right side and left side corresponding straight lines, and the respective representative points in Case 1, where the left side corresponding straight line is indicated by LL, the right side corresponding straight line is indicated by RL, and the process targeted area is indicated by R1. Furthermore, each representative point is indicated by either a solid circle or a blank circle, where the former represents each representative point that was used for the calculation of each corresponding straight line, among those representative points calculated in S102, and the latter represents each representative point other than the former. In Case 1, the condition for the definition of process targeted area R1 is that: an area that is sandwiched between the left side corresponding straight line LL and the right side corresponding straight line RL and extends in the traveling direction of the vehicle 1 and is also located distal to a representative point LPd at the most distal end of the left side corresponding straight line LL i.e. the reference corresponding straight line is defined as the process targeted area R1. In Case 1, the road on which the vehicle 1 is traveling is considered to have linear geometries on both right and left sides of the vehicle, and if the road makes a curve in such a case, an edge of the road is expected to transverse anterior to the vehicle 1 in an area that is at least distal to the most distal end of the reference corresponding straight line. Therefore, in Case 1, defining the process targeted area R1 as described above will increase the possibility that geometry of the road can be detected adequately based on the representative points within the process targeted area R1. Note that the process targeted area R1 is depicted to have a slightly wider width than the road width for ease of discrimination in FIG. 5, however, this is merely for convenience.

Figure 6:
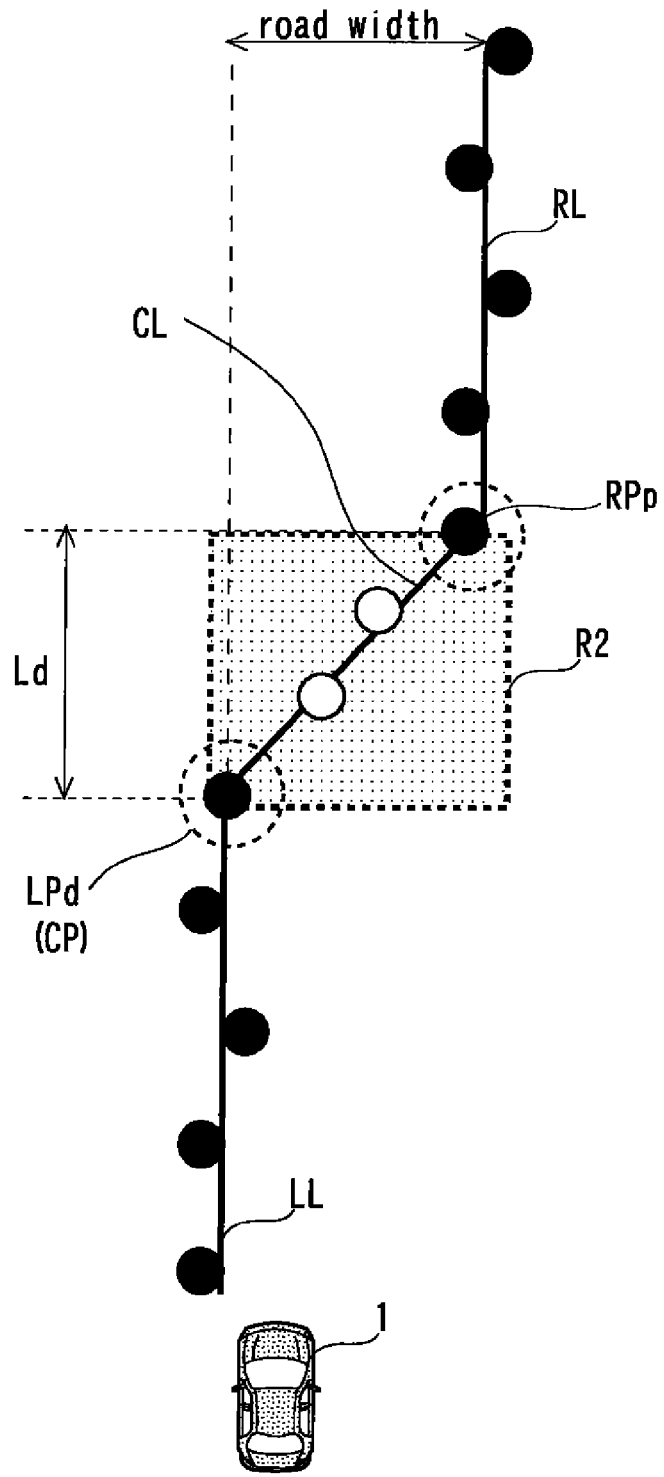
FIG. 6 is a second diagram showing a correlation between a vehicle, corresponding straight lines, and representative points at the time of execution of the road geometry information acquisition process shown in FIG. 4.

Next, the definition of process targeted area in Case 2 is described based on FIG. 6. FIG. 6 is a diagram showing a correlation between the vehicle 1, the right side and left side corresponding straight lines, and the respective representative points in Case 2, where each element is indicated in the same way as in FIG. 5. In Case 2, the condition for the definition of process targeted area R2 is that: an area that is sandwiched between the left side corresponding straight line LL and the right side corresponding straight line RL and extends in the traveling direction of the vehicle 1 and is also located distal to a representative point LPd at the most distal end of the left side corresponding straight line LL i.e. the reference corresponding straight line and proximal to a representative point RPp at the most proximal end of the right side corresponding straight line i.e. the non-reference corresponding straight line is defined as the process targeted area R2. In Case 2, although both the right side and left side corresponding straight lines were calculated, however, since they are significantly out of alignment from each other in the traveling direction, there is a possibility that the distally located non-reference corresponding straight line has not grasped geometry of the road adequately. Therefore, if the road makes a curve in Case 2, then it is highly possible that an edge of the road transverses anterior to the vehicle 1 in an area that is distal to the most distal end of the reference corresponding straight line and is also proximal to the proximal end of the non-reference corresponding straight line. Therefore, in Case 2, defining the process targeted area R2 as described above will increase the possibility that geometry of the road can be detected adequately based on the representative points within the process targeted area R2. Note that in FIG. 6, the process targeted area R2 is also depicted to have a slightly wider width, for the same reason as in FIG. 5.

Once the process targeted area is defined in S203, the process proceeds to S204, where a representative point to be used for the detection of curving geometry of the road is specified from among the representative points within the defined process targeted area. Not every representative point within the process targeted area is a representative point matched to the road geometry. For example, if a representative point that is representative of a structural object located at some distance away from the road has been calculated, then using such a representative point in the detection of curving geometry of the road will make it difficult to acquire adequate curving geometry. Therefore, a procedure for excluding such a representative point not matched to the geometry of the road is carried out in S204.

Figure 7:
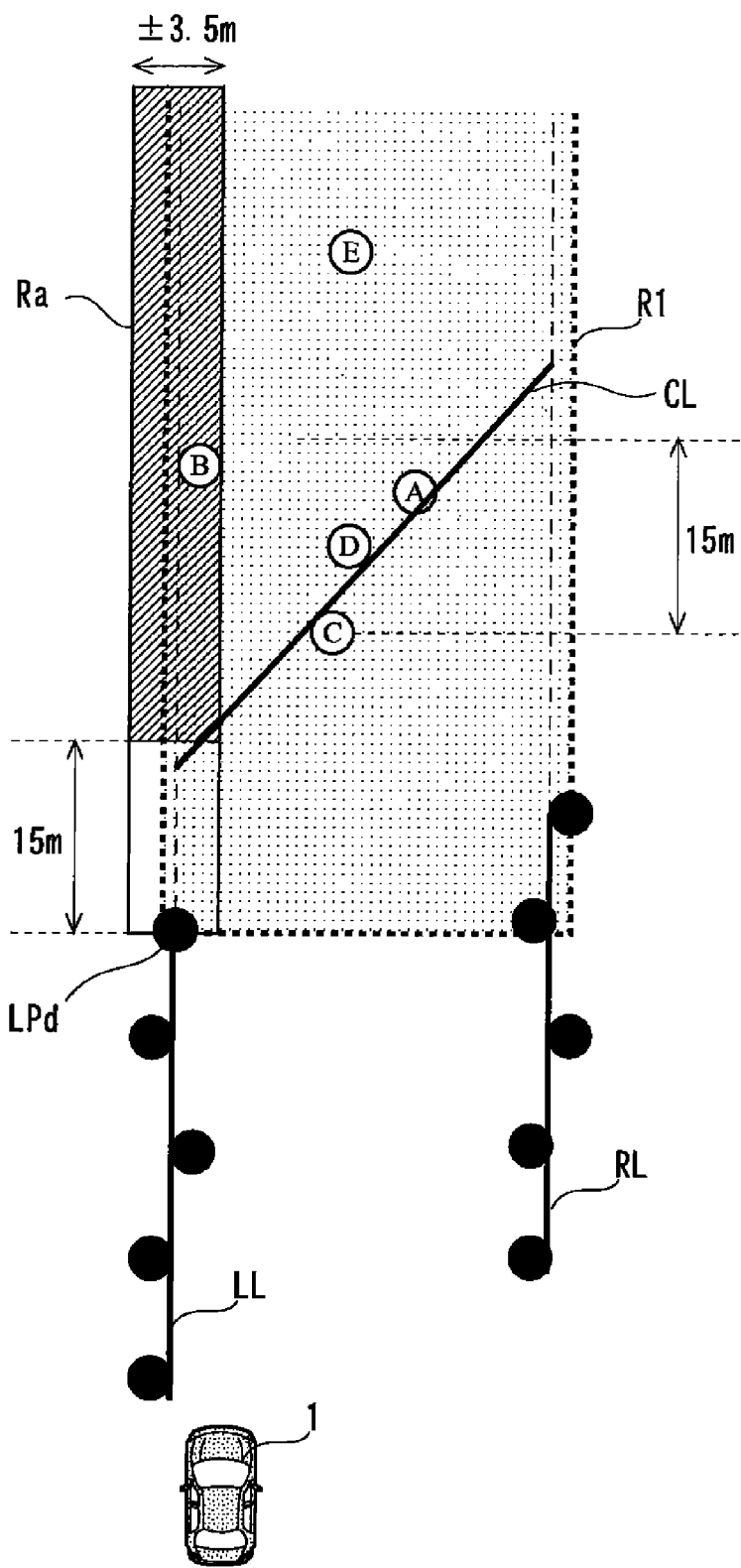
FIG. 7 is a third diagram showing a correlation between a vehicle, corresponding straight lines, and representative points at the time of execution of the road geometry information acquisition process shown in FIG. 4.

A concrete way of excluding such a representative point is now described based on FIG. 7. There are six representative points A through E existing in a process targeted area R1 shown in FIG. 7. Here, a representative point B within an area Ra is excluded from the representative points to be used for the detection of curving geometry of the road, where the area Ra is defined at a given distance (15 meters in the present embodiment) away, in the traveling direction, from a representative point LPd at the most distal end of the left side corresponding straight line LL i.e. the reference corresponding straight line as an origin, and has a width of ±3.5 meters in the transverse direction. This is because the area Ra is considered to be located substantially collinear with respect to the left side corresponding straight line i.e. the reference corresponding straight line, and in such a case, it is unlikely that a representative point in this area reflects curving geometry of the road. Furthermore, a representative point E, which is located at more than a given distance (15 meters in the present embodiment) away, in the traveling direction, from a most proximally located representative point C among the representative points within the process targeted area R1 as an origin, is also excluded from the representative points to be used for the detection of curving geometry of the road. This is because it is unlikely that a representative point that is distant to some extent from the most proximally located representative point reflects curving geometry of the road. Therefore, the representative points B and E are excluded in the case shown in FIG. 7, and the remaining representative points A, C, and D are specified as the representative points to be used for the detection of curving geometry of the road. Note that representative points within the respective process targeted areas shown in FIG. 5 and FIG. 6 represent the representative points that were specified by the procedure of S204. Once the procedure of S204 is done, the process proceeds to S205.

In S205, curving geometry of the road on which the vehicle 1 is traveling is detected. For example, in Case 1, a fitted straight line CL for representing curving geometry is calculated based on the three representative points within the process targeted area R1, as shown in FIG. 5. Specifically, for each representative point starting from the one closest to the vehicle 1 along the traveling direction of the vehicle 1, a rectangular connection range of Y3 (m) in the traveling direction and ±X3 (m) in the transverse direction with the representative point at the center is provided, and if a connection range with one representative point at the center has another representative point therein, then the representative points are deemed to have a "relationship to be connected". This may be repeated sequentially for every other representative point, and if number of representative points to be in the "relationship to be connected" is greater than or equal to a given number N3 (three, in the present embodiment), then a fitted straight line for these representative points is calculated by using the method of least squares.

Next, in Case 2, as shown in FIG. 6, a fitted straight line CL for representing curving geometry is calculated, by using the method of least squares as in Case 1, based on the representative point LPd that is the most distal end of the left side corresponding straight line LL i.e. the reference corresponding straight line and the representative point RPp that is the most proximal end of the right side corresponding straight line RL i.e. the non-reference corresponding straight line, in addition to the two representative points within the process targeted area R2.

Once the procedure of S205 is done, the process proceeds to S206, where the detection of curve starting position is performed. For example, in Case 1, as shown in FIG. 5, suppose a virtual straight line IL is drawn, in the traveling direction, from the representative point LPd that is the most distal end of the left side corresponding straight line i.e. the reference corresponding straight line, a point of intersection of the virtual straight line IL with the fitted straight line CL for representing curving geometry is detected as the curve starting position CP. On the other hand, in Case 2, since the representative point LPd has been taken into consideration in the detection of the fitted straight line CL for representing curving geometry, the position of the representative point LPd is detected as the curve starting position.

Through the procedures described in the foregoing, the detection of information on curving geometry of the road on which the vehicle 1 is traveling is done. Once the procedure of S206 is done, the process proceeds to S207. In S207, a judgment is made on whether or not the longitudinal distance difference Ld is negative. An affirmative acknowledgement here leads to S209; whereas a negative acknowledgement leads to S208. The negative acknowledgement in S207 indicates a case that corresponds to Case 2, where the right side corresponding straight line RL i.e. the non-reference corresponding straight line is located distal to the detected curving portion (portion that corresponds to the fitted straight line CL) of the road, and thus is substantially regarded as a corresponding straight line that does not reflect geometry of the road adequately, as is apparent from FIG. 6. Therefore, in S208, a disabling procedure for prohibiting the use of information on the non-reference corresponding straight line is performed, such that the information on the non-reference corresponding straight line will not be included in the road information to be detected by the road information detecting device 10. Once the procedure of S208 is done, the process proceeds to S209.

In S209, the information on the curving geometry detected in S205 and the information on the curve starting position detected in S206 are transmitted to the vehicle safety control device 5 and the vehicle cruise control device 6, as the road geometry information. In addition, the information on the calculated corresponding straight lines and the information on the aforementioned virtual straight line IL may also be included in the road geometry information and transmitted therewith, as the information for indicating linear geometry of the road. Note that if the disabling procedure with respect to the non-reference corresponding straight line was performed by S208, then the information on this corresponding straight line is not transmitted. After the procedure of S209, the road geometry information acquisition process ends.

<Use of Road Geometry Information in Vehicle Safety Control Device 5>

As can be appreciated from the foregoing, through the corresponding straight line acquisition process and the road geometry information acquisition process, geometry information on the road on which the vehicle 1 is traveling can be detected adequately. Consequently, the road geometry discrimination module 52 of the vehicle safety control device 5 can acquire the geometry information and can discriminate on what kind of curving geometry of the road the vehicle 1 under a traveling state is traveling. Therefore, in response to the result of discrimination, the alarm annunciation module 53 can announce an alarm to the driver 2 at a necessary timing to inform the existence of obstacle and/or the seatbelt control module 54 can call the driver 2's attention via the seatbelt 4. For example, if an obstacle exists in the vicinity of the curve starting point, then the driver 2, who already has started a curving operation, can avoid the obstacle with relative ease. In such a case, the procedure such as alarm annunciation is considered to be unnecessary. Therefore, even if an obstacle was detected in the traveling direction by the obstacle detecting module 51, if the road exhibits curving geometry in the traveling direction of the vehicle 1, then the procedure for calling attention by the alarm annunciation module 53 and/or the seatbelt control module 54 may not be performed. To the contrary, if it is determined that an obstacle exists on the road having linear geometry, then the procedure for calling attention such as alarm annunciation is performed. In this way, it is possible to notify the driver 2 of a truly required obstacle avoidance in an adequate manner, while not unnecessarily causing sense of discomfort to the driver 2.

<Use of Road Geometry Information in Vehicle Cruise Control Device 6>

In addition, the road geometry discrimination module 63 of the vehicle cruise control device 6 can acquire the road geometry information from the road information detecting device 10 and can discriminate on what kind of curving geometry of the road the vehicle 1 in a traveling state is traveling. Then, in response to the result of discrimination, the vehicle speed adjustment module 6 can adjust the speed of the vehicle 1 at a necessary timing in a suitable manner. For example, in case where no vehicle exists anterior to the vehicle 1 and thus the speed of the vehicle 1 is maintained at a certain speed by the inter-vehicle distance control module 61, if it is discriminated that the road exhibits curving geometry in the traveling direction of the vehicle 1, then the speed of the vehicle 1 can be automatically reduced as appropriate to the curving geometry and a state can be created such that the driver 2 can drive on the curve in a safety manner without making a brake operation. Consequently, the cruise control of the vehicle by the inter-vehicle control module 61 is continued without being canceled.

DESCRIPTION OF SYMBOLS

1 . . . vehicle
2 . . . driver
4 . . . seatbelt
5 . . . vehicle safety control device
6 . . . vehicle cruise control device
10 . . . road information detecting device
20 . . . radar device
LL . . . left side corresponding straight line
RL . . . right side corresponding straight line
CL . . . fitted straight line that corresponds to curving geometry
CP . . . curve starting point

What is claimed is:

1. A road information detecting device mounted on a vehicle, the device comprising:
a processor;
a memory accessible by the processor;
a representative point calculation module that calculates a representative point employed by the processor that corresponds to geometry of a road on which the vehicle is traveling, based on a received signal obtained by receiving a wave transmitted from a transmission antenna and reflected by a target and based on positional information on a stationary target located in a traveling direction of the vehicle;
a corresponding straight line calculation module that calculates at least one of a left side corresponding straight line that corresponds to a left side edge of the road and extends in the traveling direction of the vehicle and a right side corresponding straight line that corresponds to a right side edge of the road and extends in the traveling direction of the vehicle employed by the processor, based on positional information on a plurality of representative points detected by the representative point calculation module;
a reference corresponding straight line setting module that sets, among the corresponding straight lines calculated by the corresponding straight line calculation module, one corresponding straight line employed by the processor that has a most distal end more proximal to the vehicle than that of the other corresponding straight line as a reference corresponding straight line; and a curve information detecting module responsive to the left side corresponding straight line and the right side corresponding straight line being calculated by the corresponding straight line calculation module, that detects information on curving geometry of the road employed by the processor based on positional information on a representative point calculated in a process targeted area by the representative point calculation module, the process targeted area being an area that is sandwiched between the left side corresponding straight line and the right side corresponding straight line and extends in the traveling direction of the vehicle and is also distal to the most distal end of the reference corresponding straight line.

2. The road information detecting device according to claim 1, wherein the curve information detecting module detects information on curving geometry of the road based on positional information on the most distal end of the reference corresponding straight line, in addition to the positional information on the representative point in the process targeted area.

3. The road information detecting device according to claim 1, wherein responsive to a most proximal end of a non-reference corresponding straight line, which is a line not being the reference corresponding straight line among the left side corresponding straight line and the right side corresponding straight line calculated by the corresponding straight line calculation module, is located distal to the most distal end of the reference corresponding straight line, the curve information detecting module detects information on curving geometry of the road based on positional information on a representative point calculated in the process targeted area by the representative point calculation module, the process targeted area being an area that is sandwiched between the left side corresponding straight line and the right side corresponding straight line and extends in the traveling direction of the vehicle and is also located distal to the most distal end of the reference corresponding straight line and proximal to the most proximal end of the non-reference corresponding straight line.

4. The road information detecting device according to claim 3, wherein the curve information detecting module detects information on curving geometry of the road based on positional information on the most proximal end of the non-reference corresponding straight line, in addition to the positional information on the representative point in the process targeted area.

5. The road information detecting device according to claim 3, wherein responsive to information on curving geometry of the road was detected by the curve information detecting module, information on an edge of the road associated with the non-reference corresponding straight line is prohibited from being used as information on geometry of the road.

6. The road information detecting device according to claim 1, wherein responsive to only one of the left side corresponding straight line and the right side corresponding straight line was calculated by the corresponding straight line calculation module, the reference corresponding straight line setting module sets the calculated corresponding straight line as the reference corresponding straight line, and the curve information detecting module detects information on curving geometry of the road based on positional information on a representative point calculated in a process targeted area by the representative point calculation module, the process targeted area being an area that is sandwiched between a virtual corresponding straight line and the reference corresponding straight line and extends in the traveling direction of the vehicle and is also distal to the most distal end of the reference corresponding straight line, the virtual corresponding straight line being a line at a first given distance away from the reference corresponding straight line to the side of the other corresponding straight line among the left side corresponding straight line and the right side corresponding straight line which was not calculated by the corresponding straight line calculation module.

7. The road information detecting device according to claim 1, wherein in the detection of information on curving geometry of the road by the curve information detecting module, even a representative point calculated in the process targeted area by the representative point calculation module, positional information on a representative point that is located more than a second given distance away from the most distal end of the reference corresponding straight line along the traveling direction of the vehicle and is also located within a third given distance in the transverse direction with respect to the reference corresponding straight line is not used.

8. The road information detecting device according to claim 1, wherein in the detection of information on curving geometry of the road by the curve information detecting module, even a representative point calculated in the process targeted area by the representative point calculation module, positional information on a representative point that is located more than a fourth given distance away from a most proximal representative point along the traveling direction of the vehicle is not used.

* * * * *